United States Patent Office 2,903,481
Patented Sept. 8, 1959

2,903,481

SULFUR DIOXIDE-ACETIC ACID REACTION PRODUCT

Kwanji Murata, Kagoshima City, Japan

No Drawing. Application November 26, 1956
Serial No. 624,197

2 Claims. (Cl. 260—545)

This invenion relates to processes for the preparation of a new acidic agent.

It is an object of this invention to provide an acidic agent which offers powerful and excellent acidic action not only in aqueous solutions but also in non-aqueous solutions and is quite effective particularly as a catalyst for the esterification of cellulose.

It is also an object of this invention to provide an acidic agent having various valuable properties, for example as both purifying agent and permeating agent for cellulosic material.

It is well known that sulphurous acid has a remarkable action for dissolving out from cellulosic material various non-cellulosic substances, such as resinous matter and lignine. This action, however, is not entirely satisfactory because its degree of dissociation, a very important source of chemical actions such as acidic action, is comparatively low, since it belongs to the so-called weak acid group and its solubility in aqueous solutions is small, and it easily decomposes into sulphur dioxide and water. The desired effect of sulphurous acid can not be attained especially in non-aqueous solutions.

The acidic agent of my invention consists of or essentially contains the addition compound of a liquid lower fatty acid and sulphur dioxide, and is distinguished from a mere mixture of the fatty acid and sulphur dioxide.

The acidic agent offers powerful and effective acidic action not only in aqueous solutions but also in certain non-aqueous solutions. The addition compound is a derivative which may be regarded to be a combined or double acid of a liquid lower fatty acid and sulphurous acid both of which are weak acids, but unexpectedly it satisfactorily dissociates and has properties similar to strong acids having high degrees of dissociation, and still offers the peculiar chemical and acidic actions similar to those of sulphurous acid and sulphuric acid. The addition compound has, to some extent, the combined properties similar to those of its constituents, sulphur dioxide and the lower fatty acid, but shows its own or peculiar actions. For example, its acidic and other chemical action is stronger than any of its constituents, its reducing and oxidizing action in non-aqueous solutions is considerably weaker than that of sulphurous acid in aqueous solutions, and it is considerably stable against oxidizing agents in contrast to sulphurous acid. These facts show that the acid or acidic agent of this invention is distinguished from a mere mixture of sulphur dioxide and a fatty acid.

To ascertain whether a definite addition compound of sulphur dioxide and a liquid lower fatty acid is actually produced, I have measured the melting points of mixtures of various proportions of sulphur dioxide and acetic acid containing 1% of water and have found that the melting point curve shows the maximum of about −37° C. at the equimolecular proportions. This shows the fact that an addition compound of sulphur dioxide and acetic acid in equimolecular proportions is actually formed and this product is distinguished from a mere mixture of sulphur dioxide and acetic acid. I have also found that an acidic agent consisting of or containing the addition compound of sulphur dioxide and acetic acid offers a remarkable catalytic action in acetylation of cellulose while a mere mixture of acetic acid and sulphur dioxide does not show any catalytic action at all.

The addition compound of sulphur dioxide and liquid lower fatty acid, in its pure state, is sublimable. The addition compound is easily decomposed into sulphur dioxide and the fatty acid by hydrolysis or under reduced pressure. The hydrolysis proceeds rapidly and completely and in this case there is seen no oxidation below the room temperature.

Because of being apt to sublimate, handling and storing of the pure addition compound are accompanied with inconvenience. I have found that the addition compound is stable in the form of solution and is soluble in various solvents such as liquid lower fatty acids, ether, acetone, benzol and many other hydrocarbons and their derivatives. Therefore, to employ the addition compound in an esterification of cellulose which is most important for the present, it is preferable to produce a fatty acid solution of the addition compound.

The addition compound strongly permeates cellulose structure and is easily adsorbed by cellulose so that penetration of chemicals into cellulose is increased and made uniform. It also dissolves various substances which accompany cellulosic material such as hemi-cellulose, polysaccharide, lignine, resinous matter, etc.

In view of these excellent properties which are rather unusual and unique, the acidic agent obtained by this invention is very useful as a purifying and permeating agent for cellulosic material and as a catalyst in esterification of cellulose. It may be used as a catalyst for various other esterifying and etherifying reactions. It may also be used as an acidic catalyst or an acidic assistance in various synthetic reactions.

I have found that alcohol, phenole, hydroquinone, benzyl alcohol, benzaldehyde, mannit, various alkaloids, etc. act as inhibitors against the action of the addition compound and therefore the action of the addition compound may be controlled if it is used together with these inhibitors.

I have found that the satisfactory reaction between a liquid lower fatty acid and sulphur dioxide to produce the corresponding addition compound indispensably requires the presence of a catalyst, namely a small amount of water or an adsorbent substance such as active carbon, platinum black or the like.

When water is used as the catalyst, the induction period of the reaction is considerably long and is variable depending upon the amount of water. Generally, the velocity of the reaction between a liquid lower fatty acid and sulphur dioxide is rapidly increased as the amount of water increases up to about 4% (by weight, based on the fatty acid used). The velocity further increases gradually as the amount of water increases from about 4% to about 8%. But, if the amount of water attains about 8% or more the decomposition of the addition compound by hydrolysis becomes noticeable, while if the amount of water is too small (below 0.5%) the reaction velocity is too greatly retarded and is not practical. I have found that the range of the amount of water may be about 0.5% to about 8%, preferably about 1–4% by weight based on the fatty acid used.

I have found that the addition compound itself acts as an auto-catalyst. Therefore, the reaction velocity is promoted by previously adding a suitable amount of said addition compound to the fatty acid to be reacted with sulphur dioxide.

I have also found that the reaction is promoted if the reaction is carried out under the radiation of strong sun light or ultra-violet rays which give an activating energy and thereby shorten the induction period of the reaction.

The reaction may be carried out at room temperature. But the reaction is promoted by heating under pressurization in a tightly closed vessel or by strongly cooling (below about −40° C.) the reaction mixture.

It is very difficult to isolate the pure addition compound from the reaction mixture as the compound is vaporizable or sublimable and unstable at ordinary temperature. However, in most cases, the resulting reaction mixture may conveniently be used as an acidic agent for various purposes, particularly for esterification of cellulose.

I have found that the addition compound or the acidic agent containing the same is most conveniently produced if an adsorbent substance such as active carbon, platinum black, etc. is used as the catalyst. In this case, the existence of water is not always necessary and the reaction is carried out very smoothly and rapidly under normal temperature and pressure.

Any active carbon may be used and the amount of its use is optional without any specific requirement.

As the existence of water is not required, a concentrated acidic agent is obtained according to this method.

Several examples of the preparation of the addition compound or an acidic agent containing the same are described below.

*Example 1*

A mixture of hydrated glacial acetic acid containing 1% of water with sulphur dioxide in which the content of sulphur dioxide is more than equimolecular with respect to the content of the acetic acid is put into a tightly closed vessel and the temperature is gradually increased up to 100° C. At said temperature the reaction mixture is heated for a considerably long time. The thin colorless flake crystals of the addition compound of acetic acid and sulphur dioxide in equimolecular proportions (M.P. about −37 to −40° C.) are separated out from the mother liquor of excess liquid sulphur dioxide by cooling the reaction product below −40° C. The yield of the addition compound is approximately theoretical. The crystals may be dissolved into a desired solvent such as acetic anhydride, glacial acetic acid and toluene to obtain an acidic agent.

*Example 2*

Sulphur dioxide is dissolved and saturated in hydrated glacial acetic acid cooled with ice and containing various amounts of water as indicated below and is left alone for the respective periods of time as indicated below, in a tightly closed glass vessel at the room temperature.

| Water content percent (by weight based on acetic acid): | Reaction period (hours) |
|---|---|
| 0.5 | 2,000 |
| 1.0 | 1,500 |
| 2.0 | 1,000 |
| 4.0 | 300 |
| 6.0 | 200 |
| 8.0 | 180 |

By the above procedures, an acidic agent containing about 20–45% of the addition compound is obtained. The acidic agent is effective as a pretreating agent or catalyst in the acetylation of cellulose. The yield may be increased as desired up to 80% by prolonging the reaction hours.

The reaction period may be shortened to about ½–⅓ by radiating strong sun light or ultra-violet rays onto the reaction mixture and/or by heating under pressurization when the amount of water is small, namely below about 4%.

*Example 3*

Glacial acetic acid 100 g. are put into a closed vessel and 2 g. of finely divided active carbon are suspended therein. At room temperature, gaseous sulphur dioxide is introduced into the acetic acid at the rate of 3–5 g. per minute. After about 10 minutes the acetic acid is saturated with sulphur dioxide. Upon further continuing the introduction a mixed vapor of the addition compound, acetic acid and sulphur dioxide is evaporated. The vapor is taken out of the vessel and is cooled at about −50 to −70° C. to separate the thin colorless flake crystals of the addition compound. The crystals may be dissolved in a suitable solvent to obtain an acidic agent.

*Example 4*

The mixed vapor produced in the same manner as Example 4 is introduced and dissolved in glacial acetic acid or acetic anhydride in a separate vessel at room temperature. In this way, an acidic agent of any desired concentration up to saturation is obtained but it is preferable to saturate the glacial acetic acid or acetic anhydride with said compound to obtain a concentrated acidic agent. It is also possible to dissolve the vapor into a suitable solvent other than acetic acid and acetic anhydride. In place of the glacial acetic acid, propionic acid may be used for the reaction with sulphur dioxide.

*Example 5*

A glass column being 1.6 cm. in diameter and 18 cm. in height is filled with granular active carbon. Glacial acetic acid is flowed into the column from its top at the rate of 3 g. per minute, while sulphur dioxide gas is introduced into the column from its bottom at the rate of 3–6 g. per minute at room temperature. After a short while, a vapor consisting mainly of the addition compound comes out from the top of the column. The vapor is crystallized as in Example 3 or dissolved in a suitable solvent as in Example 4. In place of the glacial acetic acid, propionic acid may be used.

*Example 6*

Propionic acid 100 g. are put into a closed vessel and 2 g. of finely divided or granular active carbon are suspended therein. At room temperature, gaseous sulphur dioxide is introduced into the propionic acid at the rate of about 3 g. per minute. After about 15–20 minutes the propionic acid is saturated and then the active carbon is separated by filtration. The filtrate contains about 30% of the addition compound of sulphur dioxide and propionic acid and is suitable as an acidic agent, particularly as a pretreating agent or catalyst in the esterification of cellulose.

When butyric acid is used instead of propionic acid an acidic agent containing the addition compound of sulphur dioxide and butyric acid is obtained.

*Example 7*

Into 100 g. of glacial acetice acid containing, in suspension, 3 g. of granular active carbon, there is introduced at the room temperature gaseous sulphur dioxide at the rate of 4–5 g. After about 10 minutes the glacial acetic acid is saturated with sulphur dioxide. The mixture is filtered to separate the active carbon. The filtrate contains about 35% of the addition compound and is useful as an acidic agent, particularly for the esterification of cellulose.

The active carbon in Examples 3, 4, 5, 6 and 7 may be replaced by platinum black which, however, is not preferable because of being costly.

A cellulose ester such as cellulose acetate has been manufactured most commonly by treating cellulose with acetylating liquid and a small amount of sulphuric acid as a catalyst.

This method is apt to be accompanied by various side reactions and usually causes incidental formation of unstable sulpho-ester of cellulose to a greater or less extent. After the completion of the esterification the catalyst must be neutralized or removed. The neutralization causes formation of undesirable substances such as sulphates so that purification and stabilization of the cellulose ester are necessary as well known. Therefore, it has been practically impossible to effect spinning directly from the crude acetyl cellulose solution.

Furthermore, in such purification, water is added to the acetylated solution of cellulose so that the excess acetic acid and acetic anhydrides are diluted simultaneously. Consequently it normally costs a great deal to recover the acetic acid and the excess of acetic anhydride.

I have found that the acidic agent of this invention which has the various excellent properties as stated before is quite useful as a catalyst of the esterification of cellulose. It is surprising that when the acidic agent containing the addition compound as stated hereinbefore is used, the esterifying reaction proceeds effectively and smoothly without any known catalyst such as sulphuric acid, perchloric acid, etc.

When the acidic agent is used as an acidic treating agent or catalyst in esterification of cellulose, cellulose is purified, permeability of chemicals (esterifying liquid) is promoted and made more uniform, the esterifying reaction is carried on smoothly, the various difficulties which require skill and care in the known methods are easily avoided and other troubles such as incidental formation of unstable sulpho-esters of cellulose are eliminated.

One of the most important features of the esterification according to my invention resides in the fact that the addition compound is easily removed from the reaction mixture by a vacuum treatment or decomposed into the corresponding fatty acid and sulphur dioxide. Therefore, at any desired time or after the completion of the esterification the reaction mixture is vacuum-treated or filtered so that all or almost all of the addition compound is removed and its catalytic action is completely discontinued. Therefore, the control of the esterifying reaction is very easy, and stabilization of the acetyl cellulose solution may be easily effected. A slight amount of the remaining addition compound, if any, is negligibly harmful, particularly when the acetate solution is subjected to wet spinning. Therefore, it is not necessary to effect any known neutralization, purification, etc.

For example, the crude acetate solution obtained by my invention, therefore, has higher viscosity, reproducibility, uniformity in its polymerization degree, stability and purity than those obtained in any known method and keeps uniform and excellent quality. This makes the subsequent purifying or stabilizing processes quite easy or even omissible. Consequently, it is remarkable that the acetylated solution is directly spinnable. In other words, the crude acetylated solution, after the vacuum-treatment, without any known treatments such as neutralization, hydrolysis, precipitation, etc. may be directly extruded into a non-solvent coagulating bath which may be any known one and may be aqueous or non-aqueous. It is also possible, after the vacuum treatment, to extrude the crude acetate solution (with or without adding thereto a very small amount of a suitable oxidation preventing agent or a neutralizing agent to hold down the action of any trace of the remaining addition compound) directly into a hot atmosphere. Thus, the crude cellulose acetate solution according to my invention is suitable for the direct wet spinning process and the direct dry spinning process. It is also possible to make film, sheet or other shaped articles directly from the crude cellulose acetate solution. In any case, any trace of the remaining addition compound may be easily and completely removed by hydrolysis by finally washing the shaped article with water. In this case, no oxidation is seen in connection with sulphur dioxide discharged by the hydrolysis if the temperature is below about 40° C. and therefore there exists no harmful action.

It should be noted that since the excess of acetic anhydride and glacial acetic acid are not diluted with water after the completion of the acetylation, recovery of the acids is very much easier in case of the dry spinning process or the wet spinning process when non-aqueous mediums are used as the coagulation bath.

The above so-called direct spinning process may be applied not only to the crude tri-acetate solution or the primary cellulose acetate solution but also to the so-called secondary cellulose acetate solution obtained in any known manner such as by adding water or other hydrolytic agent to the primary solution and thereby carrying out hydrolytic treatment directly or further subjecting the mixture to ripening in any known manner. In this case, if the acidic agent is added to the hydrolytic agent the hydration of cellulose acetate is promoted. In the known methods, it is necessary to effect the hydration until the acetylation degree or the acetic acid content of the acetate attains the particular range within which the cellulose acetate is soluble in acetone. However, according to this invention, the acetylated solution is directly spinnable and need not always be converted into the acetone soluble form, and it is not entirely necessary to effect the hydration or hydrolization to such particular range of acetylation degree so that cellulose acetate of any desired acetylation degree (between tri-acetate and di-acetate) may be obtained for the subsequent direct spinning. This is an important feature of the acetylated solution of cellulose according to my invention.

The cellulose acetate solution or the secondary solution so obtained may be directly spinnable. Of course, it is also possible to subject the primary and secondary solution to any known subsequent treatments.

The yarn, staple fibers, films, powders or other shaped articles obtained directly not only from the secondary solution but also from the primary solution (tri-acetate solution) may be easily washed and are very stable having a carbonizing temperature of more than 260° C. These products obtained from the cellulose acetate solution according to my invention are far more superior in every property than any known product of this kind, and yet the process of the production is simpler and easier to control than any known method.

For example, even cellulose tri-acetate film obtained directly from the crude or primary solution has, unlike the brittle products obtained by the known methods, various excellent properties such as toughness and transparency.

The products produced from the acetylated solution obtained by the present invention have a very low degree of degradation in their cellulose molecules and remarkably high toughness, and therefore are suitable for stretch spinning and spinning of very strong and thin thread and may be given very fine permanent crimps and elastic elongation by suddenly transferring them from highly stretched condition to slackened condition then drying.

The method of the present invention may be directly applied also to cotton yarn and cloth. In this case the reaction proceeds more rapidly and uniformly and the cotton materials become somewhat transparent if the said method is applied to previously mercerised materials. When the acetylated products are, with or without adding a suitable softening agent or plasticizing agent, further passed through a heated calender they are easily made transparent.

In carrying out the esterification of cellulose according to my invention, the operation and equipments to be used therefor are nothing particularly different from those in the commonly known methods except that the addition compound of sulphur dioxide and a liquid lower fatty acid must be used instead of any known catalyst such as sulphuric acid, zinc chloride or perchloric acid, the use of which known catalyst should be avoided according to my invention. The addition compound may be used in the pretreatment of the cellulosic material and/or in the esterification. In any case it is absolutely necessary that a suitable amount of the addition compound be contained in the reaction mixture at the esterifying reaction stage.

The amount of the addition compound as contained in said reaction mixture should be at least 20 parts by weight in respect of 100 parts of the cellulosic material as used. However, it is preferable to use the addition compound as much as possible because the reaction (esterification) period may be shortened and the reaction temperature may be lowered as the amount of the addition compound is increased and any excess use of the addition compound does not cause any harmful action and trouble in the operation of the esterification. In this connection, it should be recalled that the synthesis of the addition compound is very simple.

After the esterification is completed, the crude acetate solution is vacuum-filtered and then vacuum-treated for about 6 hours so that all or almost all of the addition compound is removed in a gaseous state or decomposed into the corresponding fatty acid discharging sulphur dioxide gas. The solution is stabilized thereby.

The crude acetate solution so treated may be further treated in any known manner. However, most important feature is that said solution may be directly spinnable without subjecting it to any known treatment such as neutralization, hydrolysis, precipitation, etc. as explained hereinbefore.

Some examples of the esterification are given below. However, the invention is not to be limited to these examples.

Example 8

100 parts of cotton linters with a water content of 5% are pretreated for about 2 hours at the room temperature with 1300 parts of an acidic agent obtained by saturating glacial acetic acid with the addition compound of sulphur dioxide and acetic acid at room temperature as described in Example 4 or 5. The excess liquid is squeezed off to obtain about 450 parts of the pressed cake. The pre-treated cotton is then acetylated for 4–5 hours at a temperature below 35° C. with 400 parts of acetic anhydride saturated with the addition compound of acetic acid and sulphur dioxide at the room temperature as described in Example 4 or 5. In this way, the crude solution of cellulose tri-acetate is obtained. This solution may be further treated in any known manner. However, as explained hereinbefore, the crude solution is, after vacuum filtration and vacuum treatment, suitable for direct spinning without subjecting to any known neutralization, stabilization, purification, hydrolysis, precipitation, etc.

Example 9

10 parts (by weight) of absorbent cotton are immersed into 120 parts of an acidic agent containing about 30% of the addition compound of acetic acid and sulphur dioxide and obtained by reacting glacial acetic acid containing 1% of water with sulphur dioxide for 1500 hours as described in Example 2. This pretreatment is effected for 2 hours at room temperature. Next, the excess liquid is squeezed off to obtain 45 parts of the pressed cake. The pre-treated cotton is then acetylated with 45 parts of acetic anhydride for about 4.5 hours at a temperature between 25 and 35° C. In this way the crude solution of cellulose acetate having an acetic acid content of 59–62.5% and soluble in methylene chloride and hot glacial acetic acid is obtained. This solution may be further treated in any known manner, but is suitable, after vacuum-filtering, for direct spinning without subjecting to any known neutralization, purification, hydrolysis, precipitation, etc.

Example 10

10 parts of cotton linters are pretreated with 100 parts of an acidic agent containing about 30% of the addition compound of acetic acid and sulphur dioxide and obtained by reacting glacial acetic acid containing 2% of water with sulphur dioxide for about 1000 hours as described in Example 2. After about 3 hours at room temperature the excess liquid is squeezed off to obtain about 50 parts of the pressed cake. The pre-treated cotton is then acetylated for 2.5–3 hours at about 35° C. with 40–45 parts of acetic anhydride saturated with the addition compound of sulphur dioxide and acetic acid as described in Example 4. In this way the crude solution of cellulose acetate having an acetic acid content of 61–62.5% and soluble in hot glacial acetic acid as well as methylene chloride is obtained. This solution may be further treated in any known manner, but it is suitable, after vacuum-filtration to remove all or almost all of the addition compound, for direct spinning as explained hereinbefore without subjecting to any known neutralization, purification, hydrolysis, precipitation, etc.

Example 11

10 parts of cotton cloth mercerized with 12–35% caustic soda solution under non-strained condition are washed with water and then dried at a temperature below 60° C. until the water content attains about 5%. The cotton cloth is then treated for 4 hours at room temperature with 100 parts of an acidic agent containing about 30% of the addition compound of acetic acid and sulphur dioxide and obtained by reacting glacial acetic acid containing 1% of water with sulphur dioxide for about 1500 hours as described in Example 2. The whole is squeezed to attain about 25 parts. The pretreated cotton cloth is acetylated for about 4–8 hours at a temperature between 30–40° C. with a mixture of 50 parts of acetic anhydride and 100 parts of toluene, said mixture being saturated with the addition compound of acetic acid and sulphur dioxide prepared in a manner as described in Example 4 or 5. After the completion of the acetylation the acetylated cotton is washed and dried and then a plasticizer or a softening agent is added thereto. When the mixture is passed through a heated calender a transparent product is obtained.

Example 12

10 parts of cotton linters (or mercerized cotton) is immersed for 2 hours at the room temperature with 120 parts of propionic acid saturated with the addition compound of propionic acid and sulphur dioxide prepared in a manner as described in Example 4 or 5, and is then squeezed to reduce to about 30 parts. The pre-treated cotton is then esterified for 10–14 hours at 35–40° C. with 45 parts of propionic anhydride saturated with the addition compound of propionic acid and sulphur dioxide. In this way a solution of cellulose propionate having a propionic acid content of 65–75% and soluble in acetone, glacial acetic acid and a mixture of methylene chloride and alcohol. This solution may be further treated in any known manner, but it is suitable for direct spinning.

Example 13

10 parts of mercerized cotton are immersed and treated for 2 hours at the room temperature with glacial acetic acid saturated with the addition compound of acetic acid and sulphur dioxide, and then are squeezed to attain 30 parts. The pre-treated cotton is then treated for 10–14 hours at about 40° C. with a mixture of 25 parts of propionic anhydride and 20 parts of acetic anhydride, said mixture being saturated with the addition compound of sulphur dioxide and acetic acid. In this way, cellulose aceto-propionate having a propionic acid content of about 18% and an acetic acid content of about 45%.

I am aware that various proposals have been made to use sulphur dioxide in the acetylation of cellulose, but so far as I know the sulphur dioxide has never been used as chemically combined with glacial acetic acid, which combination is essential in my invention. For example, 100 parts of cotton linters containing about 5% water is treated at room temperature for 40 hours with 500 parts glacial acetic acid saturated with sulphur dioxide. The mixture is then introduced into 200 parts of glacial acetic acid and 150 parts of acetic anhydride saturated with sulphur dioxide, and the whole is treated for 5 hours at a temperature below 35° C. in the usual manner. But no substantial acetylation of cellulose is seen. This fact well shows that the addition compound is not produced in such a short period of time, namely only 40 hours, and a mere mixture of sulphur dioxide and glacial acetic acid and/or acetic anhydride does not offer any catalytic action in the acetylating reaction.

This application is continuation-in-part of my application Serial No. 301,995, now abandoned filed July 31, 1952 as a continuation-in-part of my application Serial No. 192,154 filed October 25, 1950, and now abandoned.

I claim:
1. A process for the preparation of an acidic agent which consists essentially of the addition compound of acetic acid and sulphur dioxide in equimolecular proportions, which process consists essentially of reacting sulphur dioxide and glacial acetic acid in the presence of 1 to 4%, by weight, of water based on the glacial acetic acid.

2. A process for the preparation of an acidic agent which consists essentially of the addition compound of acetic acid and sulphur dioxide in equimolecular proportions, which process consists essentially of reacting acetic acid and sulphur dioxide in the presence of active carbon as catalyst.

References Cited in the file of this patent
Scheub et al.: J. Am. Chem. Soc. 66, 841 (1944).